United States Patent [19]
Johnson

[11] 3,959,141
[45] May 25, 1976

[54] FLUID FILTER SYSTEM
[75] Inventor: Howard L. Johnson, Joliet, Ill.
[73] Assignee: Caterpillar Tractor Co., Peoria, Ill.
[22] Filed: May 8, 1974
[21] Appl. No.: 468,181

[52] U.S. Cl. ............................ 210/132; 210/134; 210/172; 210/314; 210/460
[51] Int. Cl.² ............................................ B01D 27/10
[58] Field of Search ............ 210/94, 130, 132, 134, 210/172, 232, 335, 336, 339, 460, 462, 477, 314

[56] References Cited
UNITED STATES PATENTS

| | | | |
|---|---|---|---|
| 1,806,681 | 5/1931 | Hammond | 210/532 R |
| 1,942,584 | 1/1934 | Weinstein | 210/335 X |
| 2,507,125 | 5/1950 | Townsend | 210/130 |
| 2,545,374 | 3/1951 | Nugent | 210/130 |
| 2,599,734 | 6/1952 | Winslow et al. | 210/130 |
| 2,850,168 | 9/1958 | Nostrand | 210/130 X |
| 3,021,954 | 2/1962 | Allen | 210/132 |
| 3,214,023 | 10/1965 | Donner | 210/172 |
| 3,270,884 | 9/1966 | Bremer | 210/132 X |
| 3,750,888 | 8/1973 | Rinaldo | 210/172 |
| 3,883,430 | 5/1975 | Codo | 210/172 X |
| 3,886,072 | 5/1975 | Dezelan et al. | 210/130 |

*Primary Examiner*—Charles N. Hart
*Assistant Examiner*—Robert G. Mukai
*Attorney, Agent, or Firm*—Phillips, Moore, Weissenberger, Lempio & Strabala

[57] ABSTRACT

A filter assembly for trapping particulate contaminants in a flow of fluid includes a porous cylindrical filter element, a cylindrical screen and a by-pass valve for preventing flow blockage in the event the filter should become clogged. These components are arranged in a configuration which avoids difficulties encountered with prior systems by situating the screen downstream from both the filter element and the by-pass valve and in a separate compartment from the filter. Fluid which may be diverted from passage through the filter by the by-pass valve continues to pass through the screen so that relatively large contaminants continue to be entrapped but the diverted fluid does not pass by the contaminated surface of the clogged filter and thereby pick up previously trapped matter. Either the filter or the screen may be replaced, cleaned, or otherwise serviced without disturbing the other.

2 Claims, 2 Drawing Figures

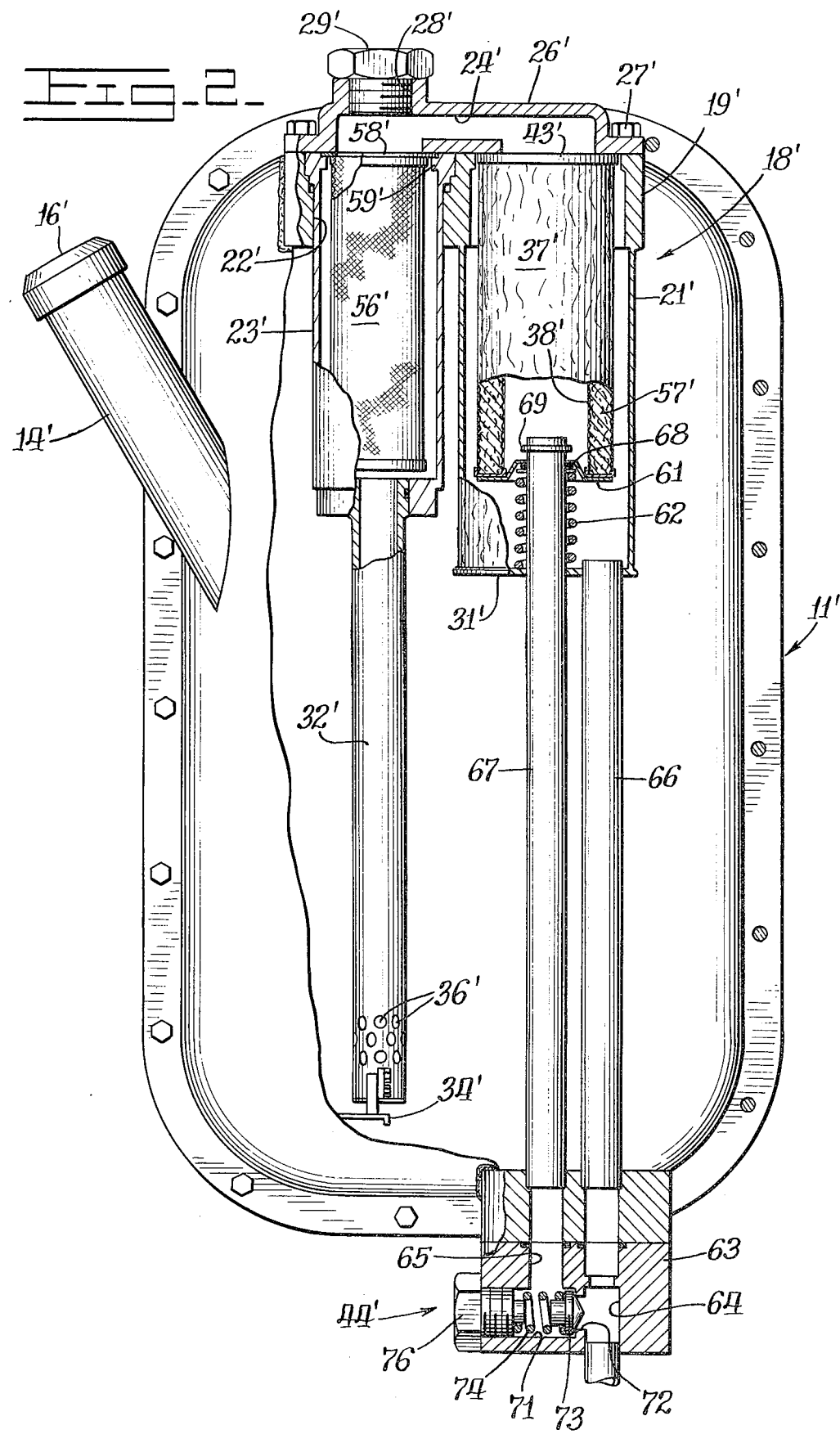

FLUID FILTER SYSTEM

BACKGROUND OF THE INVENTION

This invention relates to filter assemblies for trapping pollutants which may be present in a fluid flow and more particularly to filter assemblies of the kind having a porous filter element supplemented by screening means and having a by-pass valve for transmitting fluid independently of the filter element in the event that the filter becomes clogged.

Filter assemblies are used in various fluid systems to remove foreign particles, such as dirt, metal chips and the like, which may be present in a fluid flow. For example, tractors and earth-moving vehicles often have fluid cylinders or motors operated by hydraulic fluid which is pressurized by a pump driven by the vehicle engine. The hydraulic fluid, which may typically be oil, is drawn from a tank carried on the vehicle and returns to the tank after discharge from a motor or other hydraulic device. A filter assembly is usually provided to entrap solid particles such as dirt, metal slivers and the like which can otherwise accumulate in the tank and disrupt or damage the operation of fluid circuit components. Filter assemblies may also be desirable in other flow systems such as the fuel lines or lubricating oil system of a vehicle and also in non-vehicular apparatus of various kinds known to the art.

A common type of filter assembly utilizes a cylindrically shaped replaceable porous filter element typically formed of paper or other cellulosic material and also has a fine mesh screen for entrapping larger solid matter. It is possible for the filter element to become sufficiently clogged to inhibit fluid flow and this can cause a variety of undesirable effects including a pressure buildup at the intake side of the filter assembly. To avoid the serious consequences of flow blockage, by-pass valves have sometimes been provided which respond to a predetermined pressure buildup at the input to the filter assembly by enabling fluid to return directly to the tank without passing through the filter.

It has heretofore been the common practice to situate the cylindrical screen and filter element in close coaxial relationship to each other in an arrangement where the flow to be filtered normally passes radially inwardly or outwardly through the combined screen and filter element. It has also been a common practice to situate the by-pass valve in an arrangement where by-pass fluid is not only returned directly to the tank without any cleansing action whatsoever, but also must necessarily pass along the contaminated side of the screen and filter combination in order to reach the tank.

In prior art systems of the kind discussed above, it is not possible to replace, clean, or service the screen or the filter element without disturbing and manipulating both elements. This not only complicates maintenance but tends to cause the release of entrapped contaminants back into the flow system. Further, the by-pass arrangements may result in fluid being returned to the tank with no cleansing action whatsoever and under conditions where material previously entrapped on the filter tends to be released back into the fluid flow.

Typical prior filter assemblies are disclosed in prior U.S. Pat. Nos. 3,572,508; 3,358,835; 3,000,505; 3,221,888; 2,743,019; 2,743,017; 2,076,935 and 2,057,219. In each instance, the filter assemblies of these prior patents display one or more of the structural characteristics discussed above.

SUMMARY OF THE INVENTION

This invention provides a filter assembly wherein a filter element and screen are situated in separate compartments with the screen being downstream from the filter element. A by-pass valve is arranged to route fluid through the screen without passage through the porosities of the filter element in the event clogging causes a pressure rise at the input of the assembly but this does not involve passage of by-passed fluid along the contaminated surface of the filter. Thus, the screen remains effective to entrap large particulate contaminants regardless of whether the fluid is passing through the porosities of the filter element or not and by-passed fluid is not directed in a path whereby it will tend to become recontaminated with matter previously entrapped on the filter element. Either the filter or the screen may be serviced without disturbing the other and thereby risking the release of entrapped pollutants therefrom.

In a preferred form of the invention, a filter assembly housing has separate parallel compartments for receiving a cylindrical filter element and a cylindrical screen. Fluid flow normally passes radially inward through the cylindrical filter element and then radially outward through the cylindrical screen with the by-pass valve being arranged to pass fluid, if necessary, directly through the uncontaminated interior of the filter element. Also in a preferred form, the assembly housing may be situated within a hydraulic fluid tank but has an externally accessible removable cover which provides access to both the filter element compartment and the screen compartment.

Accordingly, it is an object of this invention to provide a fluid filter assembly having a more positive and reliable filtering action under varied operating conditions and which may be more easily serviced with minimized release of entrapped contaminants into the fluid. It is another object of the invention to provide a fluid filter assembly of the form having a by-pass valve wherein fluid by-passed around the intake side of the primary filter element continues to be filtered to some extent and is not routed past previously trapped contaminants.

The invention together with further objects and advantages thereof will best be understood with reference to the following description of preferred embodiments taken in conjunction with the accompanying drawings.

BRIEF DESCRIPTION OF THE DRAWINGS

In the accompanying drawings:

FIG. 2 is a broken out elevation view of a hydraulic fluid tank having a modified form of the filter assembly therein.

DESCRIPTION OF PREFERRED EMBODIMENTS

Figure 1:
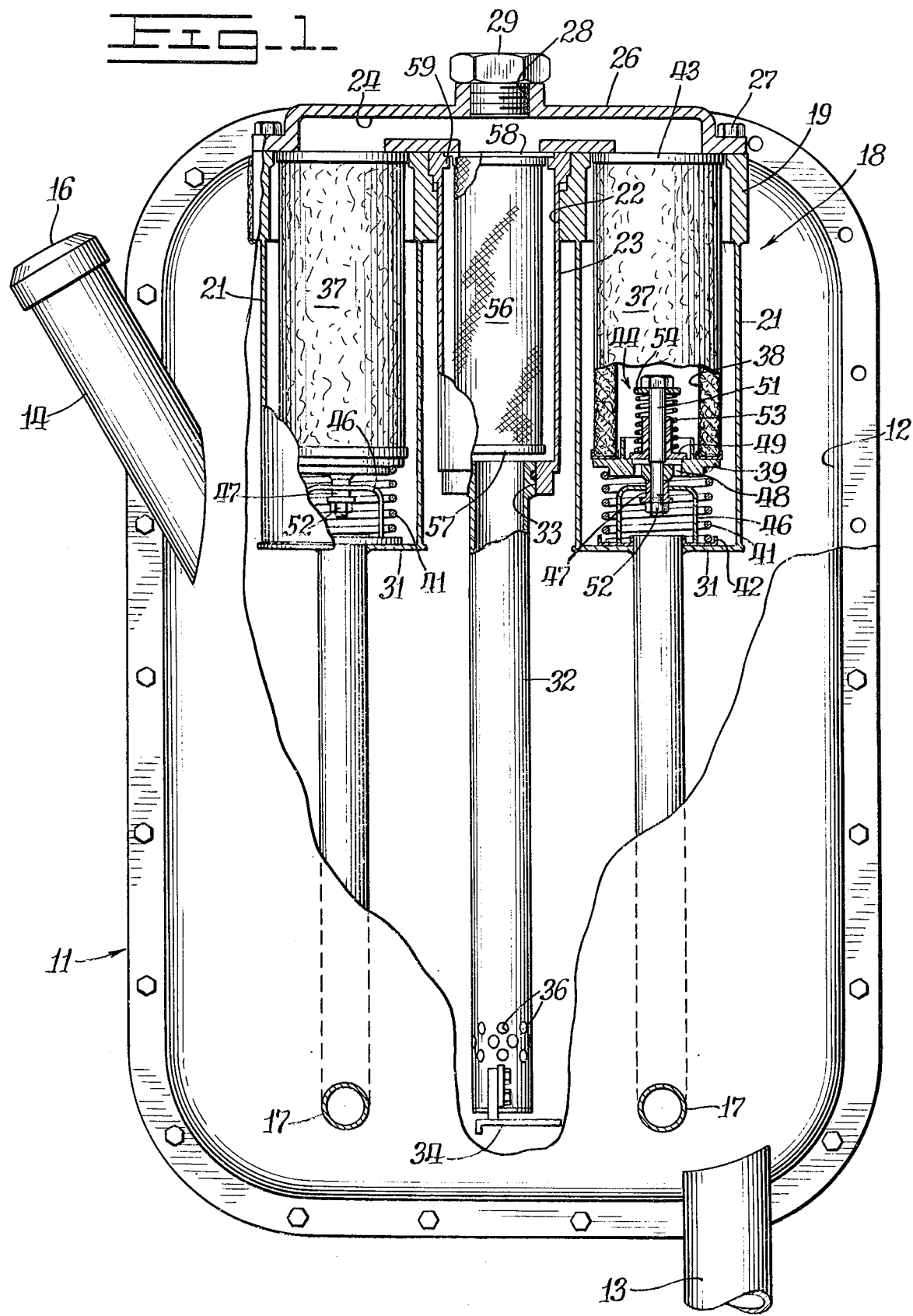
FIG. 1 is a broken out elevation view of a hydraulic fluid tank suitable for use in an earth-moving vehicle or the like and having a fluid flow filter assembly in accordance with the invention.

Referring initially to FIG. 1 of the drawings, there is shown a hydraulic fluid tank 11 of the form suitable for being carried on an earth-moving vehicle or the like and having an interior chamber 12 for storing oil or other fluid which is used to operate fluid motors or the like on the vehicle. An outlet conduit 13 may extend from the lower end of the tank 11 to supply fluid to a pump or the like for delivery to vehicle components and a filler spout 14 having a disengageable cap 16 may extend a short distance upwardly from one side of the tank. Fluid may be returned to the tank through either of two separate intake conduits 17 which enter the lower end of the tank and then extend upwardly within chamber 12 to connect with a filter assembly 18.

Filter assembly 18 has a housing member 19 which is secured by welding or other means within the upper portion of the tank 11 and has a pair of spaced apart, parallel downwardly extending, cylindrical filter compartments 21. A stepped central passage 22 is housing member 19, situated between the filter compartments 21, receives a flanged cylindrical screen compartment forming member 23. Screen compartment member 23 extends downwardly between the filter compartments in parallel relationship therewith. The compartments formed by members 21 and 23 all extend to the upper surface of housing member 19 and are intercommunicated at the upper ends by a cross passage 24 within a cover member 26 which is releasably secured to the upper end of the housing member by means such as bolts 27. Cover member 26 may be removed to provide access to all three compartments 21 and 23 for servicing, cleaning and replacement of filtering elements. An inspection aperture 28 is situated in the center of the upper surface of cover 26 directly over the screen compartment member 23 and is normally closed by a removable threaded plug 29.

Each of the fluid intake conduits 17 extends upwardly within tank 11 to communicate with an associated indivdual one of the filter compartments 21 through the bottom end closure 31 thereof, the upper end of the conduits 17 being slightly above the level of the inner surfaces of closures 31 so that solid matter which might be shaken off of the filters will tend to be retained in the filter compartments. A discharge tube 32 extends downwardly from an opening 33 in the lower end of screen compartment member 23 to a point near the bottom of the interior chamber 12 of the hydraulic tank. The lower end of discharge tube 32 is supported by a bracket 34 connected to the interior wall of the tank and the lower end of the tube has large discharge openings 36 for releasing returned filter fluid into the tank. Release of the filtered fluid near the bottom of tank 11 in this manner is desirable to prevent the aeration which might occur if the fluid were allowed to fall through an empty part of the tank.

A replaceable cylindrical filter element 37, typically formed of pleated porous paper, is situated in each filter compartment 21 in coaxial relationship therewith. Each such filter element 37 is of smaller diameter than the associated filter compartment 21 in order that fluid received through intake conduit 17 may flow around the outside surface of the filter element and then radially inward therethrough to be directed to the cover passage 24 through the interior region 38 of the filter. To position and support the filter elements 37 within the compartments 21, an annular filter seat member 39 abuts the lower end of each filter and is urged upwardly by a compression spring 41 extending between the seat member and an annular spring retainer 42 disposed against the compartment end closure 31. Each filter 37 has a flange 43 at the upper end which abuts the underside of cover 26. Thus, implacement of the cover 26 slightly compresses the springs 41 and the resultant spring force maintains the filters 37 in the desired position within compartments 21.

It is possible for the filter elements 37 to become partially or wholly clogged by entrapped solid matter to the point where circulation of fluid could be seriously inhibited and it is usually preferable under these circumstances that fluid flow be maintained even if this requires by-passing the filter elements. For this purpose, a by-pass valve assembly 44 is situated within each filter compartment 21. An inverted U-shaped bracket 46 extends upwardly from each spring retainer 42 to receive a downwardly extending sleeve projection 47 formed on each filter seat member 39. Each filter seat 39 has vertical passages 48 through which fluid may be admitted directly to the interior region 38 of the associated filter when the by-pass valve is in the opened condition. To maintain the by-pass valves normally closed, an annular valve member 49 seats against the upper surface of each filter retainer 39 to block fluid flow through the passages 48. Each valve member 49 is supported and guided by a stepped rod which may be bolt 51 that extends axially through the valve member 49 and filter seat 39 including the sleeve portion 47 thereof, and which is secured to the filter seat by suitable means such as a threaded nut 52 to urge the valve member 49 towards the normally closed position. A compression spring 53 is disposed coaxially around the upper portion of each bolt 51 with the lower end of the spring bearing against the associated valve member 49 and the upper end of the spring bearing against an annular washer 54 at the upper end of the bolt. Springs 53 normally maintain the valve members 49 against passages 48 to block any direct release of fluid into the interior chamber 38 of the filter elements without passage through the porous material of the filter itself. However, should sufficient pressure build up within a filter compartment 21 around the exterior surface of the filter element 37 due to clogging or other causes, the fluid pressure acting against the underside of valve member 49 through passages 48 becomes sufficient to lift the valve member against the force of spring 53 and thereby effectively bypasses the filter element. It should be observed that this by-pass flow path does not require that the by-passed fluid pass along the contaminated exterior surface of the filter element 37.

Fluid transmitted through the filter compartments 21, whether through the filter element 37 material or through the by-pass valve assembly 44, passes into screen compartment 23 through cover passage 24. A cylindrical, fine mesh, preferably metal screen element 56 having a closure 57 at the lower end is disposed coaxially in compartment 23. Screen 56 has a smaller diameter than compartment 23 in order to provide for fluid flow from the interior of the screen radially outward to the exterior thereof and then downward through discharge tube 32. Screen 56 may be retained in position by a flange 58 at the upper end thereof which is disposed against a radially inward extending lip 59 on compartment member 23 and which is held thereagainst by the cover plate 24.

In operation, fluid being returned to the tank 11 is admitted through one of the intake tubes 17 and under normal circumstances enters a filter compartment 21 where it passes radially inward through the porous filter element 37 and then through cover passage 24 to the screen compartment 23 where it must pass through screen 56 before being released into the interior of the tank through discharge tube 32 and tube apertures 36.

In the event that one of the filter elements 37 becomes clogged from an accumulation of solid impurities on the outer surface of the filter, fluid pressure tends to build up within the region between the filter element and the surrounding compartment 21. Such pressure acts against the underside of valve member 49 through passages 48 and upon reaching a level determined by the force of spring 53, the valve element is lifted. This enables fluid to pass directly from intake tube 17 through the clean interior region of the filter element 37 to cover passage 24 and then through the screen 56 for discharge into the tank 11 interior.

Given the above described construction, some degree of filtering is always present as fluid returning to the tank must pass through the screen 56 regardless of whether or not it has passed through porous material of the filter elements 37. Further, by-passed fluid need not pass along the contaminated exterior surface of the filter elements 37. Upon removal of cover 24, the filters 37 and screen 56 may be cleaned or replaced individually without disturbing the other such elements and thereby causing entrapped matter to be released into the fluid flow. Further, any such matter which is dislodged in the course of replacing a filter tends to settle on the bottom of the associated compartment 21 rather than being carried into the fluid volume within the tank 11.

Modifications of the structure are possible while retaining the advantages thereof. FIG. 2 illustrates a second embodiment of the invention wherein only a single filter element 37' is required and which utilizes a modified by-pass valve assembly 44' which is accessible at the exterior of the tank 11'.

The filter assembly 18' in this example includes a housing member 19' secured within the upper end of tank 11' by welding or other means and having a downwardly extending cylindrical filter compartment member 21' with a bottom end closure 31'. A cylindrical screen compartment member 23' has a flanged upper end fitted within a bore 22' in the housing member and extends downward therefrom in parallel relationship to the filter compartment member 21'. The upper ends of filter compartment 21' and screen compartment 23' are intercommunicated by a cross passage 24' within a removable cover 26' secured to the upper surface of housing member 19' by means such as bolts 27'. A removable plug 29' may be engaged in a threaded inspection aperture 28' in cover 26', the aperture being preferably situated above the screen compartment 23'.

A replaceable cylindrical filter element 37' formed of pleated porous paper or other material is disposed coaxially within the filter compartment member 21' and has a smaller diameter so that fluid within the filter compartment may flow radially inward through the filter to enter cross passage 24' of cover 26' through the interior region 38' of the filter element. The filter element 37' has a flange 43' at the upper end which abuts the underside of cover 26' and the filter is held in place by an annular filter retainer member 61. A compression spring 62 acts between the retainer member 61 and bottom closure 31' to urge the retainer member upward and thereby secures the filter element 37' in position.

A cylindrical fine mesh metallic screen member 56' is disposed coaxially within the screen compartment 23' and has a smaller diameter whereby fluid may pass from cover cross passage 24' into the interior of the screen member and then radially outward therethrough. Screen member 56' is held in this position in that a flange 58' on the upper end of the member abuts against a radially inward extending annular lip 59' at the upper end of screen compartment member 23' and the cover 24' in turn abuts the flange to secure the screen 56' in position.

A discharge tube 32' extends downwardly from the lower end of screen compartment member 23' within tank 11' with the lower end being supported by suitable bracket means 34'. Tube 32' receives fluid which is passed through the screen member 56' and releases such fluid into the interior of tank 11' through large apertures 36' near the lower end of the discharge tube.

The by-pass valve assembly 44' in this example of the invention has a housing 63 secured to the lower end of tank 11' by welding or other means, below the filter compartment member 21'. Fluid returning to the tank 11' is directed through a passage 64 in housing 63 and a tube 66 extends upward from passage 63 through the lower end closure 31' of the filter compartment 21', the upper end of tube 66 preferably being slightly above the level of the end closure.

To provide the desired by-pass action valve housing 63 has a second passage 65 extending parallel to passage 64 and connecting with a by-pass tube 67. By-pass tube 67 extends parallel to tube 66 and through the bottom end closure 31' of filter compartment 21' along the axis thereof. The upper end of by-pass tube 67 extends through spring 62 and through the filter retainer 61 including an annular resilient seal 68 carried thereon. An annular snap ring 69 is secured to the upper end of by-pass tube 67 in coaxial relation thereon to retain the filter retainer element 61 when the cover 24' and filter element 37' are removed.

Within the by-pass valve housing 63, a short bore 71 extends in from one side of the housing to communicate with the lower end of passage 65 and has a step forming a valve seat 72 through which the bore communicates with passage 64. A movable valve member 73 is disposed within bore 71 and is normally held against valve seat 72, to block comminication between passages 64 and 65, by a compression spring 74. Spring 74 is held in compression by a removable threaded plug 76 engaged in the outer end of bore 71.

In operation, fluid returning to the tank 11' normally passes through passage 64 of the by-pass valve assembly and then through tube 66 to filter compartment 21' where it must pass radially inward through the filter element 37' to reach cover cross passage 24'. The fluid then passes through the screen 56' and out through discharge tube 32' into the interior of the tank.

In the event that filter 37' should become clogged, the resultant pressure build-up within the lower and outer regions of filter compartment 21' is transmitted back through tube 66 to passage 64 where it acts on the by-pass valve element 73. When such pressure becomes sufficient to lift the valve element 73 from seat 72, the returning fluid is then redirected through passage 65 and tube 67 directly to the clean interior region 38' of the filter element 37' but must still pass through the screen 56' in order to reach the interior chamber of tank 11'.

Accordingly, the modified form of the invention depicted in FIG. 2 retains the advantages previously described with respect to the first embodiment. Specifically, the filter 37' and screen 56' are in separate compartments where each may be replaced for service without disturbing the other. Solid contaminants released in the course of replacing or servicing the filter 37' are entrapped within compartment 21' and cannot in any case reach the interior of tank 11' without passage through the screen compartment 23'. Further, should the by-pass valve assembly 44' open to by-pass the filter 37', the fluid which is redirected by such action need not flow past the contaminated side of the filter but still must be transmitted through the screen 23' in order to reach the interior of the tank.

Thus, many modifications of the system are possible and it is not intended to limit the invention except as defined in the following claims.

What is claimed is:

1. In a fluid filtering system, the combination comprising:
    a pair of filter compartments each having an inlet region and an outlet region and having means for supporting a porous filter element in the flow path therebetween, said filter compartments being parallel spaced apart upright cylinders disposed within the upper portion of a fluid reservoir tank and each having a bottom closure and each having an upper end with an opening at the upper end of said tank and wherein said filter elements are cylindrical and a separate one thereof is disposed coaxially in each of said filter compartments,
    a screen compartment separate from the filter compartments and having a fluid inlet and a fluid outlet and means for supporting a fluid permeable screen in the flow path therebetween,
    said screen compartment being an additional cylinder disposed between said pair of filter compartment cylinders in parallel relationship therewith, and wherein said fluid permeable screen is a cylindrically shaped element diposed coaxially in said screen compartment,
    a removable cover attached to said upper ends of said filter compartments and said screen compartment and having a flow conduit passage connecting said upper ends thereof to direct fluid from said outlet regions of said filter compartments to said inlet of said screen compartment,
    flow conduit means for directing fluid to said inlet regions of said filter compartments for passage through said filter elements including fluid intake tube means extending upwardly into the lower ends of each of said filter compartments,
    fluid discharge tube means extending downwardly from said lower end of said screen compartment within said tank, and
    a pair of bypass valves each being situated within the lower region of a separate one of said filter compartments and each having means for directing said fluid to said screen compartment inlet independently of said filter elements in response to a predetermined fluid pressure rise within said inlet region of the associated one of said filter compartments each bypass valve having spring biased valve means for opening a direct flow passage between the lower portion of the associated one of said filter compartments and the lower interior region of the associated one of said filter elements in respone to said predetermined pressure rise within the lower portion of the associated one of said filter compartments.

2. In a fluid filtering system, the combination comprising:
    a filter compartment having an inlet region and an outlet region and having means for supporting a porous filter element in the flow path therebetween,
    a screen compartment separate from the filter compartment and having a fluid inlet and a fluid outlet and means for supporting a fluid permeable screen in the flow path therebetween, wherein said filter compartment and said screen compartment are each upright cylindrical elements having bottom closures and which are disposed in parallel side-by-side relationship at the upper portion of a fluid reservoir tank with the upper ends of both of said filter compartment and said screen compartment opening at said upper end of said tank, and wherein said filter element is a cylindrically shaped filter disposed coaxially in said filter compartment and having a bottom closure, and wherein said fluid permeable screen is a cylindrically shaped screen element disposed coaxially in said screen compartment,
    flow conduit means for directing fluid to said inlet region of said filter compartment for passage through said filter element and for subsequently directing fluid from said outlet region of said filter compartment to said inlet of said screen compartment, said flow conduit means including a removable cover attachable against said upper ends of said filter compartment and said screen compartment and having a flow conduit passage connecting said upper ends thereof, a fluid intake tube extending upwardly into the lower region of said tank, and
    a bypass valve having means for directing said fluid to said screen compartment inlet independently of said filter element in response to a predetermined fluid pressure rise within said inlet region of said filter compartment, wherein said bypass valve includes a valve housing attached to said tank and having first and second flow passages, said first flow passage being communicated with said lower region of said filter compartment and said second flow passage being communicated with the interior of said filter element, and spring biased means for blocking communication between said first and second passages until the pressure in said first passage rises to a predetermined level.

* * * * *

UNITED STATES PATENT AND TRADEMARK OFFICE
CERTIFICATE OF CORRECTION

PATENT NO. : 3,959,141
DATED      : May 25, 1976
INVENTOR(S) : HOWARD L. JOHNSON

It is certified that error appears in the above-identified patent and that said Letters Patent are hereby corrected as shown below:

Column 8, line 42 - after "said" insert --filter compartment, and a fluid discharge tube extending downwardly from the lower region of said screen compartment within said --.

Signed and Sealed this

Twenty-eighth Day of December 1976

[SEAL]

Attest:

RUTH C. MASON
*Attesting Officer*

C. MARSHALL DANN
*Commissioner of Patents and Trademarks*